Oct. 29, 1968 G. S. MOSCHYTZ 3,408,590

ACTIVE HYBRID FILTER USING FREQUENCY EMPHASIZING AND ATTENUATING NETWORKS

Filed Oct. 31, 1966

2 Sheets-Sheet 1

INVENTOR
G. S. MOSCHYTZ
BY R C Lipton
ATTORNEY

United States Patent Office 3,408,590

Patented Oct. 29, 1968

3,408,590

ACTIVE HYBRID FILTER USING FREQUENCY EMPHASIZING AND ATTENUATING NETWORKS

George S. Moschytz, Highland Park, N.J., assignor to Bell Telephone Laboratories, Incorporated, Murray Hill, N.J., a corporation of New York Filed Oct. 31, 1966, Ser. No. 590,700
8 Claims. (Cl. 330—85)

This invention relates to wave transmission networks and, more particularly, to filter networks which utilize active networks.

It is a broad object of this invention to utilize active networks in combination with passive filters which utilize only resistive and capacitive components.

When designing wave filters it is desirable in many applications to eliminate inductors for generally cheaper and smaller capacitors and resistors. In addition, capacitor and resistor circuits may be manufactured in large quantities using building block methods utilizing, for example, tantalum thin-film. Inductive components, however, provide necessary emphasis or sharpness in the filter characteristic. This emphasis may be alternately introduced by an active network. Active networks, however, generally require extensive modification in arrangement and the values of the various passive components for each change in filter characteristic requirement.

Accordingly, it is an object of this invention to increase the versatility of active filter networks.

It is another object of this invention to provide an active filter network which is simple to design.

A further object of this invention is to simplify adjustment of active filters to obtain changes in characteristics.

In accordance with an illustrative embodiment of this invention, an active hybrid filter building block is provided comprising, in cascade, a passive filter network, comprising only capacitive and resistive components, to determine the required asymptotic filter characteristic (e.g., low-pass, high-pass, band-pass, etc.) and an active network comprising a forward gain amplifier and a feedback path to provide the necessary emphasis or sharpness. The feedback path comprises, in series, a frequency selective network having selective attenuation in the vicinity of the natural frequency of the passive filter and an amplifier in the feedback path for adjusting the feedback gain.

It is a feature of this invention to isolate the passive network and the frequency selective feedback network. Since there is no interaction between the two networks, each can be independently designed and various filter types may be alternatively utilized with a common active network. Since an amplifier follows the selective feedback network in the feedback loop, isolation can be readily obtained by utilizing an amplifier which presents a low output impedance to ground.

It is another feature of this invention that the forward gain amplifier sum the currents derived from the passive filter and the feedback network permitting adjustment in the feedback selectivity independent of the forward gain of the active network. The summing amplifier input presents a low impedance to maintain independent the forward gain from the feedback loop gain.

The foregoing and other objects and features of this invention will be more fully understood from the following description of an illustrative embodiment thereof taken in conjunction with the accompanying drawings wherein:

FIGS. 1A, 1B and 1C disclose conventional LCR filter arrangements;

Figure 1A:
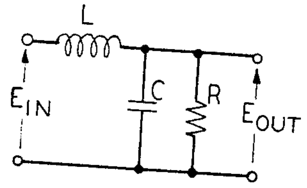
Figure 1B:
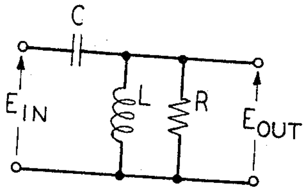
Figure 1C:
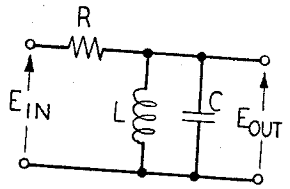

Considering now FIGS. 1A, 1B and 1C, the transfer function $T_L$ of LCR networks can be defined as the ratio of the output voltage $E_{out}$ to the input voltage $E_{in}$ $$T_L=\frac{E_{out}}{E_{in}} \qquad (1)$$

In the case of second-order low-pass LCR filters of the type shown in FIG. 1A, the transfer characteristic $T_{LP}$ can be determined by network analysis and expressed by the following equation:

$$T_{LP}=K_{LP}\frac{1}{s^2+\frac{\omega_n}{q_L}s+\omega_n^2} \qquad (2)$$

where $\omega_n$ is the natural frequency of the circuit, $$\omega_n^2=\frac{1}{LC} \qquad (3)$$

and $$q_L=R\sqrt{\frac{C}{L}} \qquad (4)$$

and $$s=\sigma+j\omega \qquad (5)$$

where $\sigma$ is the real part of the complex frequency $s$, $j\omega$ is the imaginary part and $\omega$ is the radian frequency $2\pi f$, L, C and R are the circuit inductance, capacitance and resistance, respectively, and $K_{LP}$ is a numerical constant which determines the impedance level of the network.

Similarly, the transfer characteristic $T_{HP}$ of a second-order high-pass LCR filter, such as shown in FIG. 1B, is defined as $$T_{HP}=K_{HP}\frac{s^2}{s^2+\frac{\omega_n}{q_L}s+\omega_n^2} \qquad (6)$$

where $K_{HP}$ is the numerical constant.

The transfer characteristic $T_{BP}$ of a band-pass filter of the type shown in FIG. 1C may be defined as $$T_{BP}=K_{BP}\frac{s}{s^2+\frac{\omega_n}{q_L}s+\omega_n^2} \qquad (7)$$

where $K_{BP}$ comprises the numerical constant.

When second-order passive filters utilize only resistive and capacitive elements without any inductive elements, the transfer function $T_R$ may be defined as the ratio of the output current $I_{out}$ to the input voltage $E_{in}$ $$T_R=\frac{I_{out}}{E_{in}} \qquad (8)$$

Figure 2A:
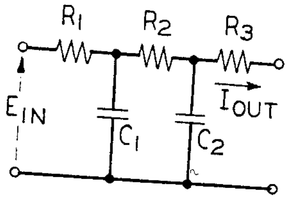
FIGS. 2A, 2B and 2C show well-known second-order RC filter circuits.

For second-order low-pass RC filters of the type shown in FIG. 2A, the transfer characteristic $T_{RLP}$ can be expressed $$T_{RLP}=K_{RLP}\frac{1}{s^2+\frac{\omega_n}{q_{RLP}}s+\omega_n^2} \qquad (9)$$

where $K_{RLP}$ is a numerical constant which determines the admittance level of the network, where the natural frequency of $\omega_n$ of the network, when squared, is defined as $$\omega_n^2=\frac{R_1+R_2+R_3}{C_1C_2R_1R_2R_3} \qquad (10)$$

where $$q_{RLP}=\frac{\sqrt{C_1C_2R_1R_2R_3(R_1+R_2+R_3)}}{C_1R_1(R_2+R_3)+C_2R_3(R_1+R_2)} \quad (11)$$

and where $C_1$ and $C_2$ are the capacitances of similarly identified capacitors in FIG. 2A, and $R_1$, $R_2$ and $R_3$ are the resistances of the resistors in FIG. 2A.

Figure 2B:
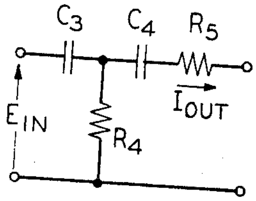

With respect to second-order high-pass RC filters such as shown in FIG. 2B, the transfer characteristic $T_{RHP}$ is defined as $$T_{RHP}=K_{RHP}\frac{s^2}{s^2=\frac{\omega_n}{q_{RHP}}+\omega_n^2} \quad (12)$$

where $K_{RHP}$ is the numerical constant determining the circuit admittance, where the natural frequency $\omega_n$, when squared, is defined $$\omega_n^2=\frac{1}{C_3C_4R_4R_5} \quad (13)$$

where $$q_{RHP}=\frac{\sqrt{C_3C_4R_4R_5}}{R_4(C_3+C_4)+C_4R_5} \quad (14)$$

and where $C_3$ and $C_4$ are the capacitances of similarly identified capacitors and $R_4$ and $R_5$ are the resistances of similarly identified resistors in FIG. 2B.

Figure 2C:
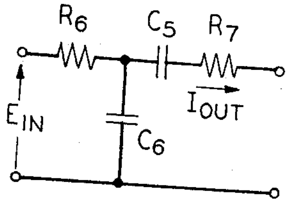

For second-order band-pass RC filters of the type shown in FIG. 2C, the transfer characteristics $T_{RBP}$ is expressed $$T_{RBP}=K_{RBP}\frac{s}{s^2+\frac{\omega_n}{q_{RBP}}s+\omega_n^2} \quad (15)$$

where $K_{RBP}$ is the numerical constant, the natural frequency $\omega_n$, when squared, is expressed as $$\omega_n^2=\frac{1}{C_5C_6R_6R_7} \quad (16)$$

and $$q_{RBP}=\frac{\sqrt{C_5C_6R_6R_7}}{R_6(C_5+C_6)+C_6R_7} \quad (17)$$

and where $C_5$ and $C_6$ are the capacitances of similarly identified capacitors and $R_6$ and $R_7$ are resistances of similarly identified resistors in FIG. 2C.

Figure 3A:
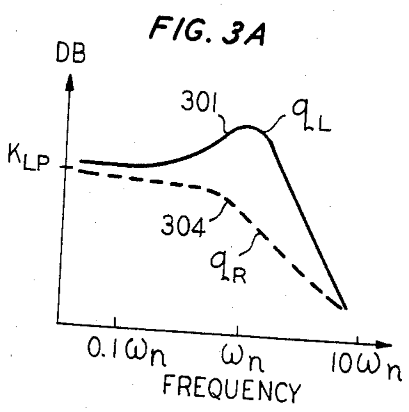
FIGS. 3A, 3B and 3C depict wave forms corresponding to the characteristics of certain filter networks.
Figure 3B:
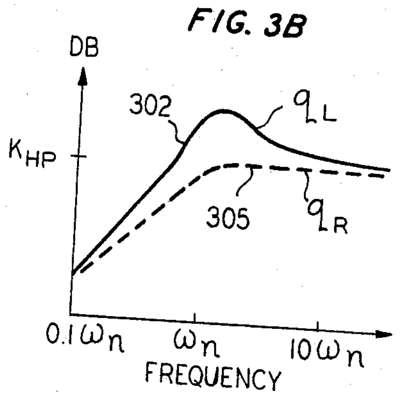
Figure 3C:
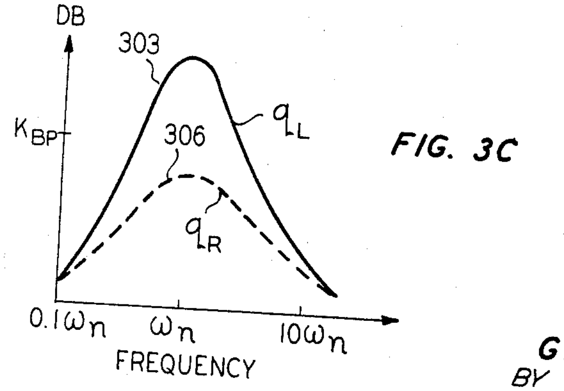

In general, the value of $q$ is related to the accentuation of the filtering action at the natural frequency. In LCR networks, $q_L$ conventionally attains a value greater than 0.5 and the circuit shows a relative gain. Curves 301, 302 and 303 in FIGS. 3A, 3B and 3C disclose the transfer characteristics, expressed in decibels plotted against the frequency expressed in radians per second on a logarithmic scale, of low-pass, high-pass and band-pass LCR filters, respectively. As observed in curves 301, 302 and 303, accentuation in the form of peaking of the wave is provided at the natural frequency of the respective filter. For RC networks, however, the equivalent term $q_R$ has a limited value which cannot exceed 0.5, resulting in a dampening of the resultant transfer characteristic as shown in curves 304, 305 and 306 in FIGS. 3A, 3B and 3C, which similarly disclose the transfer characteristic plotted against frequency of low-pass, high-pass, and band-pass RC filters. Accordingly, RC networks introduce significant dampening or loss, especially at the natural frequency of the filter and, therefore, by themselves do not provide the sharp filter characteristics of LCR networks.

To derive transfer characteristics of LCR networks using RC networks, an additional network is provided, having a characteristic which functions to correct the RC network characteristic to correspond to the LCR network. This correction function can be obtained by dividing the desired characteristic of the LCR network by the available transfer characteristic of the RC network. This calculation results in the correction characteristic $F_{LP}$ for low-pass filters, which is defined in the following equation:

$$F_{LP}=\frac{K_{LP}}{K_{RLP}}\,\frac{s^2+\frac{\omega_n}{q_{RLP}}s+\omega_n^2}{s^2+\frac{\omega_n}{q_L}s+\omega_n^2} \quad (18)$$

Following similar calculation, the correction function $F_{HP}$ for high-pass filters comprises:

$$F_{HP}=\frac{K_{HP}}{K_{RHP}}\,\frac{s^2+\frac{\omega_n}{q_{RHP}}s+\omega_n^2}{s^2+\frac{\omega_n}{q_L}s+\omega_n^2} \quad (19)$$

Similarly, the correction function characteristic $F_{BP}$ for band-pass filters comprises:

$$F_{BP}=\frac{K_{BP}}{K_{RBP}}\,\frac{s^2+\frac{\omega_n}{q_{RBP}}s+\omega_n^2}{s^2+\frac{\omega_n}{q_L}s+\omega_n^2} \quad (20)$$

Since our correction network characteristics again include $q_L$ which cannot be obtained by RC networks, as previously discussed, it is necessary to provide active networks in cascade with the RC networks to derive the results defined by the correction network equations.

Figure 4:
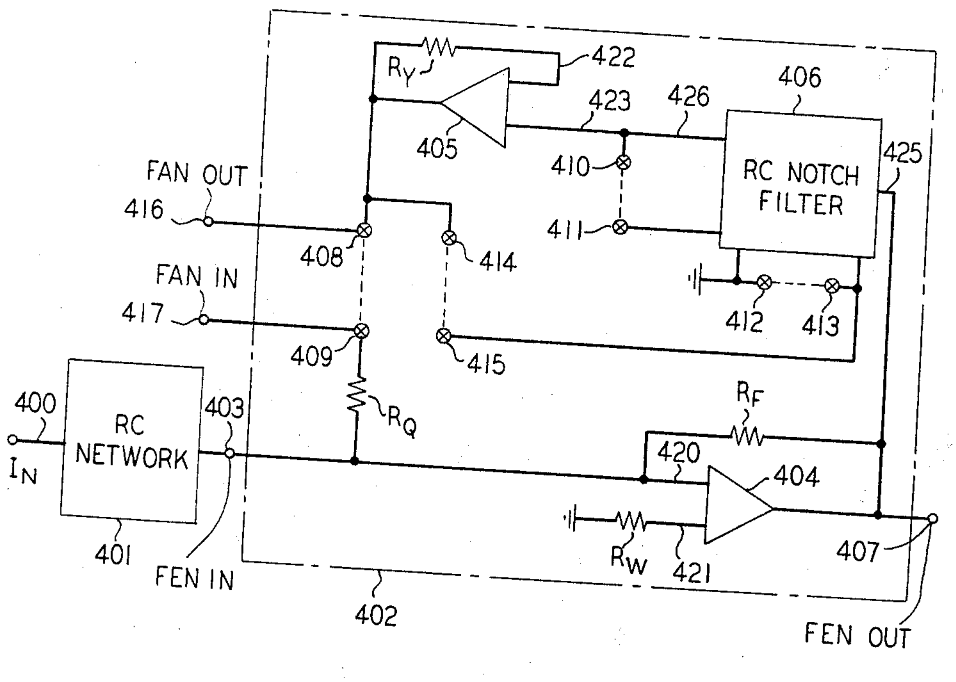
FIG. 4 shows, in cascade, a passive network and an active network in accordance with this invention.

Referring now to FIG. 4, an RC network which may advantageously be of the type shown in FIGS. 2A, 2B or 2C, is generally identified by block 401. The output of RC network 401 is connected in cascade with an active filter network generally indicated by block 402 by way of input terminal 403. The output of active network 402 comprises output terminal 407.

In general, active network 402 includes a first amplifier 404 and a feedback circuit comprising a frequency selective network generally indicated by block 406 and a second amplifier 405. Amplifiers 404 and 405 advantageously have low output impedance, together with an inverting and a non-inverting input, such as inverting inputs 420 and 422 and non-inverting inputs 421 and 423 of amplifiers 404 and 405 respectively. In addition, the inverting input, such as input 420, acts as if it has a low impedance to ground and, therefore, appears as a virtual ground. In addition, the amplifiers are advantageously arranged for monolithic construction. A suitable amplifier for use as amplifiers 404 and 405 is disclosed in an article in the October 1965, "Proceedings of the National Electronics Conference," on p. 85, entitled "A Unique Circuit Design for a High Performance Operational Amplifier Especially Suited to Monolithic Construction," by R. J. Widlar.

Considering now amplifier 404, it is seen that inverting input 420 is connected to input terminal 403, while non-inverting input 421 is connected to ground by way of resistor $R_W$. Stabilization of amplifier 404 is provided by feedback of the signal output to inverting input lead 420 by way of resistor $R_F$. The output of amplifier 404 is passed to output terminal 407 and, in addition thereto, is fed back through the feedback network. This feedback proceeds to input lead 425 of frequency selective network 406, which advantageously comprises a notch filter as described hereinafter. Output 426 of filter network 406 is connected to non-inverting input lead 423 of amplifier 405 with the output of amplifier 405 fed back through resistor $R_Y$ to inverting input 422. Amplifier 405 provides a non-inverting output to terminal 408 and a high input impedance to signals provided to non-inverting input 423.

To derive the desired correction network characteristics in accordance with the terms of Equations 18, 19 and 20, terminal 408 in network 402 is connected to terminal 409, thereby providing negative feedback to the inverting input lead 420 of amplifier 404 by way of resistor $R_Q$. Accordingly, to obtain the results defined by correction network Equations 18, 19 and 20, the output of RC network 401 is connected to input terminal 403 of active network 402 and terminals 408 and 409 are strapped together, as are terminals 412 and 413. All other terminals generally indicated in FIG. 4 as having optional strappings, as designated by dotted lines, are open and the output of network 402 is obtained from output terminal 407.

In general, with RC network 401 connected in cascade with active network 402 and network 402 terminals interconnected as described above, the signal output of RC network is amplified and inverted by operational amplifier 404, provided to output terminal 407 and fed back via notch filter 406, amplifier 405 and resistor $R_Q$. Thus, with amplifier 404 presenting a low input impedance, the currents from RC network 401 are summed with the currents from the feedback circuit through resistor $R_Q$. Since amplifier 407 presents a low input impedance, RC network 401 is not effected by the feedback currents presented by notch filter 406. In addition, since amplifier 405 presents a low output impedance, notch filter 406 cannot be effected by currents from RC network 401. Thus, RC network 401 and notch filter 406 are isolated from one another while the output currents thereof are summed by amplifier 404.

Figure 5:
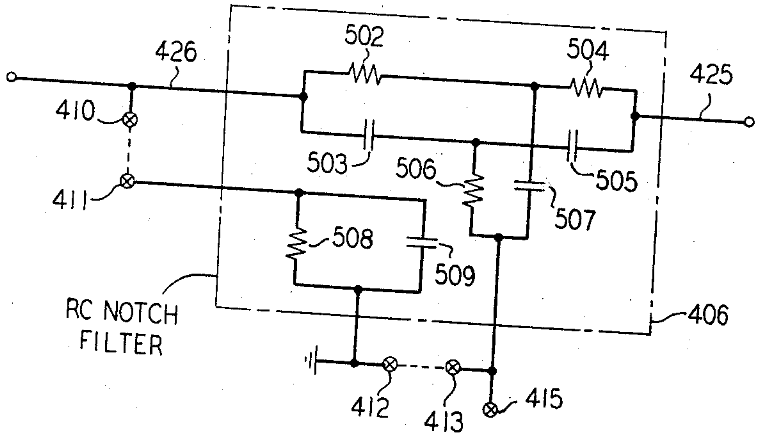
FIG. 5 discloses a frequency selective network suitable for use in the feedback path of the active network of this invention.

Referring now to FIG. 5, there is shown a notch filter suitable for use as a frequency selective network 406. Notch filter 406 is arranged as the well-known twin-T structure and advantageously includes resistor 502 and capacitor 503, having a resistance $R_N$ and a capacitance $C_N$, respectively. In addition, notch filter 406 includes resistors 504 and 506, which resistors advantageously have resistances proportionate to the resistance of resistor 502, namely, resistor 504 having a resistance of $R_N$ and resistor 506 having a resistance $$R_N\frac{a}{(1+a)} \tag{21}$$

Similarly, filter 406 includes capacitors 505 and 507, capacitor 505 having a capacitance of $C_N/a$ and capacitor 507 having a capacitance of $$C_N\frac{1+a}{a} \tag{22}$$

It is noted that the proportionate values of the components as fixed by a ratio including a numerical constant $a$ are not necessary for this invention but merely for simplifying calculations described hereinafter.

Filter 406 also includes resistor 508 and capacitor 509 in parallel and connected between terminal 411 and ground. For the purposes of the present discussion, however, terminal 411 is open, disconnecting resistor 508 and capacitor 509 from the circuit. As previously described, terminal 413 is connected to terminal 412 and thence to ground, whereby ground is applied to resistor 506 and capacitor 507.

The overall transfer characteristic $T_L$ of active network 402, connected as described above, may be expressed as $$T_F=\frac{E_2}{I_1}=-\frac{R_F}{1+\frac{R_F}{R_Q}\beta\cdot T_N} \tag{23}$$

where $E_2$ is the output voltage, $I_1$ is the input current, $R_F$ is the resistance of the similarly identified resistor $R_F$ in network 502, $R_Q$ is the resistance of the similarly identified resistor $R_Q$, $\beta$ is the gain of amplifier 405 and $T_N$ is the transfer characteristic of notch filter 406.

The transfer characteristic $T_N$ of notch filter 406 when arranged in accordance with the proportionate values of the components therein, as described above, may be expressed as follows:

$$T_N=\frac{s^2+\omega_n^2}{s^2+\frac{\omega_n}{q_N}s+\omega_n^2} \tag{24}$$

where $$q_n=\frac{1}{2}\cdot\frac{a}{1+a} \tag{25}$$

and $$\omega_n=\frac{1}{R_NC_N} \tag{26}$$

Substituting now the expression for $T_N$ defined in Equation 24 for the similarly identified term in Equation 23, there is obtained the following equation:

$$T_F=K_F\frac{s^2+\frac{\omega_n}{q_N}s+\omega_n^2}{s^2+\frac{\omega_n}{q_F}s+\omega_n^2} \tag{27}$$

where $$q_F=\left(1+\frac{R_F}{R_Q}\cdot\beta\right)\cdot q_N \tag{28}$$

and $$K_F=\frac{R_F}{1+\frac{R_F}{R_Q}\cdot\beta} \tag{29}$$

Assuming now that RC network 401 comprises the low-pass filter circuit shown in FIG. 2A, it is recalled that the correction characteristic $F_{LP}$ for this low-pass filter is defined in Equation 18. Comparing this correction characteristic $F_{LP}$ with transfer characteristic $T_F$ of active network 402 as defined in Equation 27, it is apparent that if the natural frequency $\omega_n$ of active network 402 is identical to the natural frequency of the low-pass filter circuit in network 401, then the transfer characteristic $T_F$ of active network 402 will provide the appropriate correction characteristic for the low-pass filter if $q_N$ of the active network is rendered equal to $q_{RLP}$ of the correction characteristic equation and $q_F$ of the active network is rendered equal to $q_L$ of the correction characteristic equation.

Referring now to Equation 25, it is seen that $q_N$ can be modified by modifying the proportionate ratio $a$ of the values of the resistance and capacitance components in frequency selective network 406, whereby $q_N$ may be rendered equal to $q_{RLP}$.

Going now to Equation 28, it is seen that the value of $q_F$ may be varied inversely by modifying the resistance of resistor $R_Q$. In this manner $q_F$ may be rendered equal to $q_L$ in Equation 18. Accordingly, by modifying the proportionate relationship of the resistance and the capacitance in active network 406 and modifying the resistance of resistor $R_Q$, the transfer characteristic $T_F$ of active network 402 may be rendered equal to the correction characteristic $F_{LP}$ for low-pass filter, whereby active network 402 provides the appropriate correction characteristic for the low-pass filter in network 401.

In a similar manner it is seen that transfer characteristic $T_F$ may be rendered equal to the correction characteristic $F_{HP}$ defined in Equation 19 if RC network 401 comprises a high-pass filter of the type shown in FIG. 2B. In this event, $q_N$ and $q_F$ in Equation 27 is rendered equal to $q_{RHP}$ and $q_L$ in Equation 19 in substantially the same manner as the low-pass filter case, whereby if the natural frequency $\omega_n$ of the active network is identical to the natural frequency of the high-pass filter, active network 402 provides the appropriate correction characteristic.

Similarly, in the event that RC network 401 comprises a band-pass filter of the type shown in FIG. 2C, active network 402 provides the appropriate correction characteristic as defined in Equation 20 by utilizing the same natural frequency and rendering $q_N$ and $q_F$ equal to $q_{RBP}$ and $q_L$, respectively, in Equation 20. Accordingly, it is seen that a single active network, such as network 402, may provide the appropriate correction characteristic for low-pass, high-pass and band-pass second-order RC networks. In addition, it is seen that modification of $R_Q$ provides a corresponding modification of feedback gain and thus the selectivity of the network without modifying the forward gain via amplifier 404 whereby selectivity may be changed independently of overall network gain.

It is recalled that the passive RC network 401 is a second-order network and, therefore, is arranged similar to an RC ladder network portion. It is further recalled that amplifier 404 presents a low output impedance whereby output terminal 407 of active network 402 provides a low output impedance. Accordingly, a ladder network can be formed by cascading RC network 401 and active network 402, arranged to provide the appropriate frequency emphasis to simulate an LCR network with corresponding passive and active networks by connecting terminal 407 with the input to the next RC network corresponding to lead 400. Desired characteristics of ladder networks can thus be readily provided since the individual building blocks are non-interacting.

In certain applications, especially wherein RC network 401 comprises a band-pass filter of the type shown in FIG. 2C, it is desirable that active network 402 provide high selectivity. In order to provide active network 402 with a high Q, or frequency selectivity, RC network 401 is connected to input terminal 403 and the output is derived from output terminal 407, whereby the previously described frequency emphasizing network is cascaded with RC network 401. Under this condition, however, the optional strapping connecting terminals 412 and 413 is open and the optional strapping connecting terminals 410 to 411 and terminals 414 to 415 is closed. Under this condition resistor 508 and capacitor 509 are connected to ground across the input of amplifier 405, permitting the use of an amplifier having gain equal to or larger than unity. In addition, the output of amplifier 405 is provided back through terminals 414 and 415 to the junction of resistor 506 and capacitor 507. Since the optional strapping between terminals 412 and 413 is open and ground is no longer applied to this junction a feedback path is now provided for amplifier 405, which thereby accentuates the frequency selectivity of the notch in the filter characteristic. Accordingly, under this application, especially applicable for band-pass filters, active network 402 provides for a high Q application increasing the frequency selectivity of the RC network 401 in cascade with active network 402.

Active network 402 may also be utilized as a frequency attenuation network, i.e., a network wherein the maximum peak of attenuation occurs at the natural frequency. Under this arrangement the optional strapping between terminals 408 and 409 is open, the input signal is provided to terminal 417, which terminal is connected to terminal 409 and output derived from terminal 416, the latter terminal being connected to terminal 408. In addition, the optional strapping between terminals 414 and 415 is closed, as is the strapping between terminals 410 and 411, while the strapping between terminals 412 and 413 is open. The opening of the strappings between terminals 408 and 409 disables the feedback circuit and inputting to terminal 417 is passed by way of amplifier 404 and thence to notch filter 406. With the optional strappings between terminals 410 and 411 closed, the use of amplifier 405 with gain equal to or greater than unity is permissible, as previously described. In addition, the completion of the strappings between terminals 414 and 415 provides increased frequency selectivity, as previously described. Similarly, outputting is now derived from amplifier 405 whereby the well-known notch filter characteristic is provided. In addition, since the output of amplifier 405 presents a low impedance, successive frequency attenuation networks may be cascaded by connecting output terminal 416 to input terminal 417 of the successive network 402.

Although the specific embodiment of this invention has been shown and described, it will be understood that various modifications may be made without departing from the spirit of this invention and within the scope of the appended claims.

What is claimed is:

1. In a wave transmission network, a passive filter network which includes only resistive and capacitive elements and a frequency emphasizing network connected in cascade with said passive filter network for accentuating the transmission characteristic at the natural frequency of said passive filter network, said frequency emphasizing network including a first amplifier and a feedback circuit connected between the input and output of said first amplifier, said feedback circuit including in series a frequency selective network having an attenuation peak at said natural frequency and a second amplifier arranged with said first amplifier to isolate said frequency selective network from said passive network.

2. In a wave transmission network in accordance with claim 1 wherein said passive filter network is a low-pass filter.

3. In a wave transmission network in accordance with claim 1 wherein said passive filter network is a high-pass filter.

4. In a wave transmission network in accordance with claim 1 wherein said passive filter network is a band-pass filter.

5. In a wave transmission network in accordance with claim 1 wherein said frequency selective network is a notch filter.

6. In a wave transmission network in accordance with claim 5 wherein said notch filter is a twin-T structure.

7. In a wave transmission network in accordance with claim 1 wherein said first amplifier presents a low input impedance to ground to feedback currents and currents from said passive network.

8. In a wave transmission network in accordance with claim 1 wherein the output of said second amplifier is connected to the input of said first amplifier by way of a resistor in said feedback circuit, said second amplifier presenting a low output impedance.

References Cited

UNITED STATES PATENTS

| | | | |
|---|---|---|---|
| 2,383,984 | 9/1945 | Oberweiser | 333—704 XR |
| 2,788,496 | 4/1957 | Linvill | 333—70 X |

ROY LAKE, *Primary Examiner.*

J. B. MULLINS, *Assistant Examiner.*